United States Patent
Hsieh et al.

(10) Patent No.: US 6,954,226 B2
(45) Date of Patent: Oct. 11, 2005

(54) METHOD OF DETECTING AN OBJECT'S MOTION BY A DIGITAL CAMERA

(75) Inventors: Chun-Hsing Hsieh, Hsinchu (TW); Yuan-Jen Hsiao, Hsinchu (TW)

(73) Assignee: Elecvision Inc., Hsinchu (TW)

( * ) Notice: Subject to any disclaimer, the term of this patent is extended or adjusted under 35 U.S.C. 154(b) by 667 days.

(21) Appl. No.: 09/988,375

(22) Filed: Nov. 19, 2001

(65) Prior Publication Data

US 2002/0060737 A1 May 23, 2002

(30) Foreign Application Priority Data

Nov. 22, 2000 (TW) ........................................ 89124837 A

(51) Int. Cl.[7] .............................................. H04N 5/228
(52) U.S. Cl. ................................... 348/208.1; 348/155
(58) Field of Search ................................ 348/155, 254, 348/208.1, 152, 169, 153, 154

(56) References Cited

U.S. PATENT DOCUMENTS

| | | | | |
|---|---|---|---|---|
| 5,267,035 A | * | 11/1993 | Weckenbrock et al. | ........ 348/97 |
| 5,561,498 A | * | 10/1996 | Sekine et al. | ............... 396/53 |
| 5,654,762 A | * | 8/1997 | Slavin et al. | .......... 375/240.24 |
| 5,682,205 A | * | 10/1997 | Sezan et al. | ................ 348/452 |
| 6,081,606 A | * | 6/2000 | Hansen et al. | .............. 382/107 |
| 6,122,319 A | * | 9/2000 | Lee et al. | .............. 375/240.16 |
| 6,130,964 A | * | 10/2000 | Marques et al. | ............ 382/236 |
| 6,160,586 A | * | 12/2000 | Justiss et al. | ............... 348/452 |
| 6,301,385 B1 | * | 10/2001 | Chen et al. | ................. 382/173 |
| 6,381,277 B1 | * | 4/2002 | Chun et al. | ............ 375/240.12 |

\* cited by examiner

*Primary Examiner*—Ngoc-Yen Vu
*Assistant Examiner*—Hung H Lam
(74) *Attorney, Agent, or Firm*—Nath & Associates PLLC; Harold L. Novick

(57) ABSTRACT

A method of detecting motion is described. A first image is captured and exposed by a digital camera. The first image information is transferred to a control device. Gray level values of a specific group in the first image are then stored. Real-time gray level values corresponding to the specific group in a real time image are subsequently captured. The real-time gray level values of the specific group in a real time image are compared with the gray level values of the specific group in the first image. An amount of specific points with different gray level between the specific groups in the real-time image and the first image greater than N indicates an object of the real-time image is in motion or else the object of the real-time image is motionless. A sequential step for the object detected to be in motion is then performed. The real-time gray level values of the specific group in the real-time image are stored as the gray level values of the specific group in the first image.

16 Claims, 2 Drawing Sheets

METHOD OF DETECTING AN OBJECT'S MOTION BY A DIGITAL CAMERA

FIELD OF THE INVENTION

This invention relates generally to digital cameras, and more particularly to a method of detecting motion for a digital camera to improve extra functions in the digital cameras.

BACKGROUND OF THE INVENTION

Conventional digital cameras can simply capture and input image information. The image information should be further processed by a general purpose computer and then transferred to a peripheral apparatus or transferred from the peripheral apparatus into the computer and then processed. As calculation capability of the computer is enhanced increasingly, an advanced digital camera is provided to take a photo image, digitalize the image and store the digital image. In addition, the digital camera may have a function of taking a motion picture. The motion image information is converted to a video format to be filed or played. Thus, the digital camera can create the video information except for the image information.

As information technology is rapidly developing, the digital camera has already become a hot digital product in the past few years. The image information can be directly input into a general-purpose computer without using conventional film, The image information may be edited in the computer to operate in coordination with the popular application of the Internet. Further, the semiconductor technology is enhanced continuously, causing the production cost to decrease continuously. The functions of the digital camera are newly and variously designed; consequently more and more people expect to have a digital camera. A motion detection function is especially distinctive for the digital camera.

The digital camera essentially includes four units as schematically shown in FIG. 1. An image sensor 102 receives an optical image signal, which is further converted to digital image information. A lens unit 101 is used to form an image on the image sensor 102. A control device 103 is used for controlling all units in the digital camera to input/output image information or further process the image information. A storage device is used for storing the digital image information. The optical image signal of an object is formed through the lens unit 101 on a light sensitive surface of the image sensor 102. The control device 103 controls the image sensor 102 to convert the optical image signal to digital image information. The digital image information is further transferred to the control device 101 or directly to the storage device 104 if the digital image information will not be further processed. The storage device 104 can be a nonvolatile memory, such as EEPROM, Flash, or a volatile memory, such as DRAM, SRAM. The control device 103 processes or determines the image information form the image sensor 102 and controls actions of all elements or units and coordinating operation between the units.

A motion detection function has been available for quite some time. However, some prior art detecting motion methods have employed expensive external apparatus, such as infrared or microwave motion detector devices, and a computer with mass calculation capability. Since the conventional method of detecting motion utilizes a complicated mathematical algorithm, the original microprocessor of the control device of the digital camera is not burdened with the extra functions for detecting motion. The microprocessor should be replaced by one with a mass process capability, but this increases the cost of the digital camera. Besides, the conventional method of detecting motion needs a large capacity memory and a lot of time to detect motion. Comparing with the above-mentioned conventional method, the present invention has an advantage of a simple mathematical algorithm. Therefore, a need exists to provide a method of detecting motion for digital cameras to solve the problems of the conventional detecting method.

SUMMARY OF THE INVENTION

A general object of the present invention is to provide a digital camera with extra functions, including a motion detection function in addition to the normal functions of a digital camera. The digital camera will perform some corresponding action, such as take photos automatically, take a motion picture, sound an alarm, or flash an LED light to assist a system operator, if the camera detects that an object is in motion.

An another object of the present invention is to provide a motion detection method for digital cameras, which method utilizes the original elements of the digital camera to achieve the motion detection function and achieve certain accuracy.

In one embodiment of the present invention, a digital camera with a motion detection function utilizes an image sensor for transferring image information to a control device. The control device further processes the image information as follows. Gray level values of a specific group in the first image are stored. Real-time gray level values corresponding to the specific group in a real-time image are subsequently captured. The real-time gray level values of the specific group in a real-time image are compared with the gray level values of the specific group in the first image. Next, whether any one of gray level differences between the specific groups in the real-time image and the first image is greater than a predetermined threshold value is determined. A gray level difference greater than the threshold value indicates that an object of the real-time image is in motion or else no motion occurs in the real-time image. A sequential step for the object detected to be in motion is then performed, such as taking photos automatically, taking a motion picture, sounding an alarm, or flash an LED light. The real-time gray level values of the specific group in the real-time image are stored as the gray level values of the specific group in the first image.

In another embodiment of the present invention, a method of detecting motion is provided which includes preliminarily capturing and exposing a first image by a digital camera. The first image information is transferred to a control device. Gray level values of a specific group in the first image are then stored. Real-time gray level values corresponding to the specific group in a real time image are subsequently captured. The real-time gray level values of the specific group in a real time image are compared with the gray level values of the specific group in the first image. An amount of specific points with different gray levels between the specific groups in the real-time image and the first image greater than N indicates that an object of the real-time image is in motion or else no motion occurs in the real-time image. A sequential step for the object detected to be in motion is then performed, such as taking photos automatically, taking a motion picture, sounding an alarm, or flashing an LED light. The real-time gray level values of the specific group in the real-time image are stored as the gray level values of the specific group in the first image.

Therefore, the method of the present invention utilizes a low cost digital camera and may be implemented on a simple microprocessor. A region for detecting motion may be precisely defined by simply adjusting or setting the lens of the digital camera.

As mentioned above, the present invention provides a method of detecting motion that merely uses a simple and cheap microprocessor, such as a PIC, for processing motion-detecting calculations. An extra capacity memory isn't in necessary for motion detection according to the present invention. The control device is used for receiving the image information from the image sensor to further determine whether an object of the captured image is in motion or not. Therefore, an extra function of the digital camera is achieved without upgrading the original elements of the digital camera.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
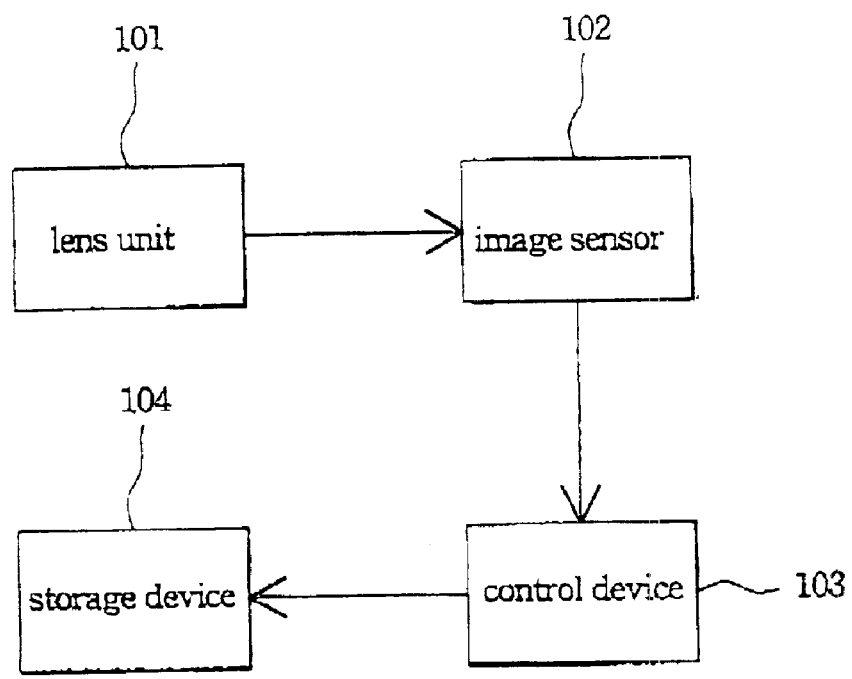
FIG. 1 is a schematic block diagram of a digital camera.

The present invention discloses a method of detecting motion for use in a digital camera without any extra element or apparatus, which merely utilizes the original elements of the digital camera. Referring to FIG. 1, the present invention is stored in the storage device 104 of the control device 103. Then, an extra function of the digital camera, such as security, can be achieved. The method of detecting motion in accordance with the present invention utilizes the control device 103 to control the image sensor 102 performing repeated actions of exposing images. The control device 103 then receives the image information from the image sensor 102 after each exposing action. The control device calculates the image information including information of a specific group in the image. Confirmation of the calculated result indicates an object of the image is in motion. Otherwise, the object of the image is motionless or no motion occurs in the captured image. The image information received from the image sensor 102 does not need to be stored in a random access memory before being calculated by the control device 103. Thus, the image information may be directly calculated or be stored in the image storage device to wait for further processing by another peripheral apparatus.

Figure 2:
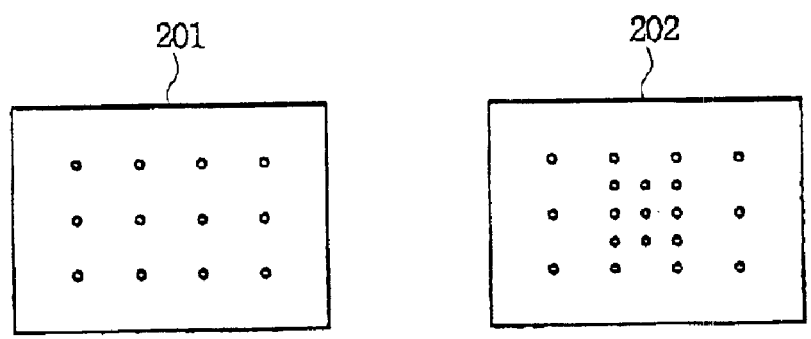
FIG. 2 is a drawing illustrating distribution of specific points in an image in accordance with the method of detecting motion for a digital camera according to the present invention.

A specific region selected from an image for detecting is defined as the specific group in the present invention. The specific group includes one specific point or a plurality of specific points, as can be seen in FIG. 2. The amount of the specific points depends on the user's demands; it may be one, ten, or more. A demand for more specific points requires more complicated while accuracy increases. The plurality of specific points on the image is arranged in order to form the specific group. Referring to FIG. 2, the specific group 201 includes 12 specific points uniformly distributed over the image, which indicates detection of an entire image. The specific group 202 includes 19 specific points of which 10 specific points are distributed around the edge of the image and 9 specific point are concentrated on a central portion of the image. This indicates that the detection region is the entire image but is focused on the central portion of the image. Selection of more points results in detection of more points, which results in high detecting accuracy. The locations of the specific points decide the detecting region in accordance with the motion detection method of the present invention.

Figure 3:
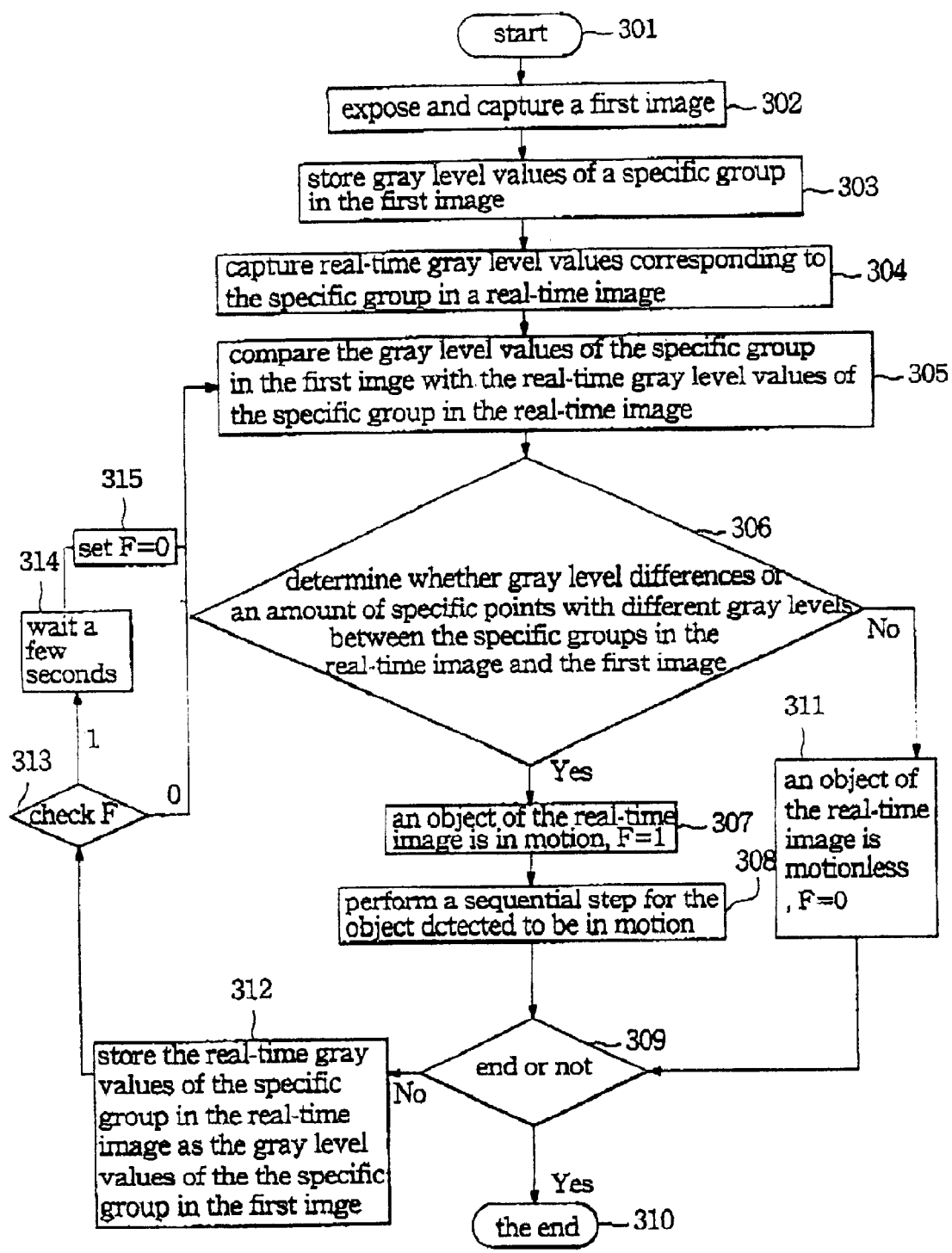
FIG. 3 is a flowchart of the method of detecting motion for a digital camera in accordance with the present invention.

FIG. 3 shows a flowchart of the motion detection method for a digital camera in accordance with the present invention. In one embodiment of the present invention, a motion detection mode is automatically set and started when the digital camera is turned on (step 301). The image sensor 102 exposes, captures and then transfers image information to the control device 103 (step 302). The control device 103 recognizes automatically the specific points of the specific group in the first image and stores gray level values G1, G2, G3 . . . of specific points of the specific group in the first image (step 303). The digital camera captures sequentially a real-time image and transfers image information to the control device. The control device 103 recognizes and stores real-time gray level values P1, P2, P3 . . . corresponding to the specific points of the specific group in the real-time image (step 304). The real-time gray level values of the specific group in the real-time image are compared with the gray level values of the specific group in the first image (step 305). The gray level values of the specific group in the first image are subtracted from the real-time gray level values of the specific group in the real-time image to generate a plurality of gray level differences D1, D2, D3 . . . of the corresponding specific groups. Whether any one of gray level differences between the specific groups in the real-time image and the first image is greater than a predetermined threshold value T (step 306) is determined. The predetermined threshold value is adjustable; selection of a lower threshold value results in greater accuracy in motion detection. In the specific group, any one of the gray level differences greater than the threshold value (Dx>T) indicates that an object of the real-time image is in motion (step 307). Otherwise, the object of the real-time image is motionless or no motion occurs in the real-time image (step 311). If any one of the gray level differences is determined to be greater than the threshold value (Dx>T), a sequential step is then automatically performed (step 308), such as taking photos, taking a motion picture, sounding an alarm, or flashing an LED light to assist a system operator or a guard.

In another embodiment of the present invention, a mode of detecting motion is automatically set and started when the digital camera is turned on (step 301). The image sensor 102 exposes, captures and then transfers image information to the control device 103 (step 302). The control device 103 recognizes automatically the specific points of the specific group in the first image and stores gray level values G1, G2, G3 . . . of specific points of the specific group in the first image (step 303). The digital camera captures sequentially a real-time image and transfers image information to the control device. The control device 103 recognizes and stores real-time gray level values P1, P2, P3 . . . corresponding to the specific points of the specific group in the real-time image (step 304). The real-time gray level values of the specific group in the real-time image are compared with the gray level values of the specific group in the first image (step 305). The gray level values of the specific group in the first image are subtracted from the real-time gray level values of the specific group in the real-time image to generate a plurality of gray level differences D1, D2, D3 . . . of the corresponding specific groups. Whether an amount of specific points with different gray level between the specific groups in the real-time image and the first image is greater than N (step 306) is determined. In other words, whether the amount of the non-zero gray level differences of the specific points is greater than the N value is determined. The N value is adjustable; selection of a lower N value results in a more accurate motion detection. In the specific group, the amount of specific points with non-zero gray level differences greater than N indicates that an object of the real-time image is in motion (step 307). Otherwise, the object of the real-time image is motionless or no motion occurs in the real-time image (step 311). If the amount of specific points with non-zero gray level differences greater than N is determined, a sequential step is then automatically performed (step 308), such as taking photos, taking a motion picture, sounding an alarm, or flashing an LED light to assist a system operator or a guard.

An example of the specific group 201 having 12 specific points in FIG. 2 is illustrated as follows. P1 is representative of the gray level value of a specific point 1, P2 is representative of the gray level value of a specific point 2 . . . P12 is representative of the gray level value of a specific point 12. G1 is representative of the gray level value of the specific point 1 in the first image, G2 is representative of the gray level value of a specific point 2 in the first image . . . G12 is representative of the gray level value of a specific point 12 in the first image. Then, G1 is compared with P1, G2 with P2 . . . G12 with P12, respectively, to generate a plurality of gray level differences D1, D2 . . . D12. In the first preferred embodiment of the present invention, whether any of the gray level differences D1, D2 . . . D12 is greater than the threshold value T is determined to indicate that the object in the detecting region is in motion. For example, T=25, any one of the gray level differences D1, D2 . . . D12 greater than 25, which indicates the object in the detecting region is in motion. On the other hand, all the gray level differences D1, D2 . . . D12 are smaller than 25, which indicates that no motion has occurred in the detecting region. In the second embodiment of the present invention, an amount of the corresponding specific points with different gray level greater than N value is determined to indicate that the object in the detecting region is in motion. For example, N=5, 5 specific points of the 12 specific points with different gray level value indicate that the object in the detecting region is in motion. On the other hand, the amount of the specific points with different gray level values is less than 5, which indicates that no motion has occurred in the detecting region.

The above threshold value T and N value both are adjustable to represent a sensitivity of the motion detection function for the digital camera. If the values are set large, which means that any motion of the object is detected when variation of the gray level value is large enough or the amount of the specific points with different gray level value is large enough. If the values are set small, which means that any motion of the object is detected when few of the specific points with different gray level value are detected, the sensitivity is higher than the above.

Finally, the real-time gray level values of the specific group in the real-time image are stored as the gray level values of the specific group in the first image (step 312). The original gray level values of the specific group in the first image described above are replaced to continue with the next detecting motion. Furthermore, to avoid detecting repeatedly when the object is in motion, a flag parameter F is introduced in the procedure. The parameter F is set equal to 0 when no motion occurs, whereas the parameter F is set equal to 1 when the object is in motion. The parameter F is first checked when proceeding with the next detecting motion procedure (step 313). If the parameter F is equal to 0, the motion detection steps are then sequentially performed. If the parameter F is equal to 1, the motion detection steps are stopped for a few seconds (step 314). The parameter F is reset equal to 0 (step 315) to continue the motion detection steps.

As is understood by a person that skilled in the art, the foregoing preferred embodiment of the present invention are illustrative rather than limiting of the present invention. It is intended to cover various modifications and similar arrangements included within the spirit and scope of the appended claims, the scope of which should be accorded the broadest interpretation so as to encompass all such modifications and similar structure.

While the preferred embodiment of the invention has been illustrated and described, it will be appreciated that various changes can be made therein without departing from the spirit and scope of the invention.

What is claimed is:

1. A method of detecting motion for digital camera, said method comprising the steps of:
    storing gray level values of a specific group in a first image; capturing real-time gray level values corresponding to said specific group in a real-time image;
    comparing said real-time gray level values of said specific group in said real-time image with said gray level values of said specific group in said first image;
    determining whether gray level differences between said specific groups in said real-time image and said first image are greater than a predetermined threshold value, wherein said gray level differences greater than said threshold value indicate an object of said real-time image is in motion or else no motion is occurring in the real-time image;
    performing a sequential step for the object detected to be in motion when said gray level value differences are greater than said threshold value;
    storing said real-time gray level values of said specific group in said real-time image as said gray level values of said specific group in said first image;
    setting a parameter F equal to 1 when the object of said real-time image is determined to be in motion;
    setting said parameter F equal to 0 when the object of said real-time image is determined to be motionless;
    checking said parameter F;
    sequentially performing the motion detection steps when said parameter F is equal to 0; and
    stopping motion detection steps for a predetermined time when said parameter F is equal to 1 and resetting said parameter F equal to 0 to continue the motion detection steps.

2. The method according to claim 1, wherein said specific group substantially includes one or a plurality of specific points selected from said images.

3. The method according to claim 2, wherein said specific points are uniformly distributed over entire image.

4. The method according to claim 2, wherein said specific points are partially concentrated on a central portion of entire image for enhancing detecting efficiency of the central portion of entire image.

5. The method according to claim 2, wherein an amount of said specific points is adjustable depending on the detecting efficiency.

6. The method according to claim 1, wherein the step of determining whether gray level differences between said specific groups in said real-time image and said first image are greater than a predetermined threshold value further comprises:

subtracting said gray level values of said specific group in said first image from said real-time gray level values of said specific group in said real-time image to generate a plurality of gray level differences of said corresponding specific groups; and determining whether said gray level differences are greater than said predetermined threshold value;

wherein any one of said gray level differences being greater than said predetermined threshold value indicates the object of said real-time image is in motion.

7. The method according to claim 6, wherein said threshold value is adjustable for changing a detection sensitivity of the digital camera.

8. The method according to claim 1, wherein said sequential step comprises taking photos, taking a motion picture, sounding an alarm, or flashing a LED light to warn a system operator or a guard.

9. A method of detecting motion for a digital camera, said method comprising the steps of:

storing gray level values of a specific group in a first image;

capturing real-time gray level values corresponding to said specific group in a real-time image;

comparing said real-time gray level values of said specific group in said real-time image with said gray level values of said specific group in said first image;

determining whether an amount of specific points with different gray levels between said specific groups in said real-time image and said first image is greater than N, wherein the amount of specific points with different gray levels greater than N indicates an object of said real-time image is in motion or else no motion in the real-time image;

performing a sequential step for the object detected to be in motion when the amount of specific points with different gray levels is greater than N; and storing said real-time gray level values of said specific group in said real-time image as said gray level values of said specific group in said first image; setting a parameter F equal to 1 when the object of said real-time image is determined to be in motion;

setting said parameter F equal to 0 when the object of said real-time image is determined to be motionless;

checking said parameter F;

sequentially performing the motion detection steps when said parameter F is equal to 0; and Stopping motion detection steps for a predetermined time when said parameter F is equal to 1 and resetting said parameter F equal to 0 to continue the motion detection steps.

10. The method according to claim 9, wherein said specific group substantially includes one or a plurality of said specific points selected from said images.

11. The method according to claim 10, wherein said specific points are uniformly distributed over entire image.

12. The method according to claim 10, wherein said specific points are partially concentrated on a central portion of entire image for enhancing detection efficiency of the central portion of entire image.

13. The method according to claim 10, wherein an amount of said specific points is adjustable depending on the detection efficiency.

14. The method according to claim 9, wherein the step of determining whether an amount of specific points with different gray levels between said specific groups in said real-time image and said first image is greater than N further comprises:

subtracting said gray level values of said specific group in said first image from said real-time gray level values of said specific group in said real-time image to generate a plurality of gray level differences of said corresponding specific groups; and determining whether an amount of said gray level differences unequal to zero is greater than N;

wherein the amount of said gray level differences unequal to zero being greater than N indicates the object of said real-time image is in motion.

15. The method according to claim 14, wherein N is adjustable for changing a detection sensitivity of the digital camera.

16. The method according to claim 9, wherein said sequential step comprises taking photos, taking a motion picture, sounding an alarm, or flashing a LED light to warn a guard.

* * * * *